United States Patent
Singh

(10) Patent No.: US 11,389,833 B1
(45) Date of Patent: Jul. 19, 2022

(54) CURVILINEAR SURFACE CLASSIFICATION OF FEED STOCK

(71) Applicant: Nutriati, Inc., Henrico, VA (US)

(72) Inventor: Krisan Singh, Midlothian, VA (US)

(73) Assignee: TATE & LYLE SOLUTIONS USA LLC, Hoffman Estates, IL (US)

( * ) Notice: Subject to any disclaimer, the term of this patent is extended or adjusted under 35 U.S.C. 154(b) by 0 days.

(21) Appl. No.: 17/470,733

(22) Filed: Sep. 9, 2021

(51) Int. Cl.
- *B07B 4/02* (2006.01)
- *B03C 7/00* (2006.01)
- *B07B 9/00* (2006.01)
- *A23N 15/00* (2006.01)

(52) U.S. Cl.
CPC .............. *B07B 4/02* (2013.01); *A23N 15/00* (2013.01); *B03C 7/00* (2013.01); *B07B 9/00* (2013.01); *A23N 2015/008* (2013.01)

(58) Field of Classification Search
CPC .. B07B 4/02; B07B 7/00; B07B 7/086; B07B 7/0865; B07B 11/00; B07B 11/06; A23N 15/00; A23N 2015/008
See application file for complete search history.

(56) References Cited

U.S. PATENT DOCUMENTS

| | | | | |
|---|---|---|---|---|
| 4,153,541 A * | 5/1979 | Rumpf | ............... | B07B 7/0865 209/143 |
| 4,802,977 A * | 2/1989 | Kanda | ............... | B07B 7/086 209/143 |
| 5,106,487 A * | 4/1992 | Nemedi | ............... | C22B 1/005 209/44.2 |
| 5,591,253 A * | 1/1997 | Altman | ............... | B01D 45/16 55/460 |
| 5,927,510 A * | 7/1999 | Leute | ............... | B07B 7/083 209/142 |
| 5,934,478 A * | 8/1999 | Mitsumura | ............... | B07B 11/04 209/143 |
| 6,015,048 A * | 1/2000 | Mitsumura | ............... | B07B 11/06 209/143 |
| 6,896,477 B1 * | 5/2005 | Kertesz | ............... | B07B 4/02 415/203 |
| 2018/0071783 A1 * | 3/2018 | Kloeser | ............... | B07B 7/04 |
| 2018/0141087 A1 * | 5/2018 | Ivanovich Orsyk | . | B01D 33/073 |

* cited by examiner

*Primary Examiner* — Michael McCullough
*Assistant Examiner* — Kalyanavenkateshware Kumar
(74) *Attorney, Agent, or Firm* — Woods Rogers PLC; Timothy Bechen

(57) ABSTRACT

A method and system for air classification of a milled feed stock includes generating a feed stream by combining the milled feed stock with at least one gasflow element, wherein the milled feed stock includes a plurality of particle sizes. The method and system includes directing the feed stream across a curvilinear surface, such that the milled feed stock in the feed stream separates into a plurality of classification streams, each of the plurality of classification streams based on the particle sizes of the milled feed stock. Therein, the method and system separates the plurality of classification streams and collects each of the plurality of classification streams, thereby classifying the milled feed stock contained therein based on the particle sizes for each of the plurality of classification streams.

17 Claims, 3 Drawing Sheets

CURVILINEAR SURFACE CLASSIFICATION OF FEED STOCK

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

There are no related applications.

FIELD OF THE INVENTION

The disclosed technology relates generally to processing plant-based food items and more specifically to the processing and classification of varying fractionations of a plant-based feed stock.

BACKGROUND OF THE INVENTION

There are varying techniques for milling and classifying feed plant-based feed stock. With the further growth of plant-based protein and meat-substitutes, there are needs for improving separation and classification. This separation and classification has many important reasons, including improving the ability to more efficiently extract the compositional elements of the feed stock, such as proteins, fibers, starches, etc.

Existing classification techniques rely on screening and sieving based on size. Other techniques use a rotating air classifying wheel that separates the particles of the feed stock based on size, density, and drag in the air stream. Both these techniques are limited, for example static forces can have unintended consequences in the screening process causing particle agglomerates that require larger energy usage for proper classification.

Other problems can include clogging of screens. The immediate solution for clogging is increasing a screen surface area, but when feed stock is classified in the micron ranges, scaling of screen size is not economically or operationally feasible. As to rotating technology, inclusion of moving parts introduces a natural fail rate, complicating the economics and efficiencies of air classification.

As such, there exists a need for improved techniques for separating and classifying feed stock that does not rely on outdated screens and sieves, as well as moving parts.

DESCRIPTION OF THE INVENTION

The present invention provides a method and system for air classification of a milled feed stock that improves over the existing prior art. The method and system generates a feed stream by combining the milled feed stock with at least one gasflow element, the milled feed stock includes the feed stock milled into a variety of particles sizes.

The method and system includes directing the feed stream across a curvilinear surface. As the feed stream goes over the curvilinear surface, the feed stream separates into a plurality of classification streams.

As the feed stream, consisting of a carrier gas and the milled feed stock, passes over the curvilinear surface along the same vector, the particles each possess an inertia that is proportional to their mass and are each influenced proportionally to coanda pulling forces imparted by the gasflow across the curvilinear surface of a defined radius. Therein, wherein the smaller particle sizes naturally separate from the larger particle sizes. This separates the feed stream into different classification streams based on the distance the particles travel out from the curvilinear surface.

As the particles separate, the method and system therein collects the different classification streams. Therein, the milled feed stock is separated into containers having particles within the associated sizing range.

RELATED APPLICATION

A better understanding of the disclosed technology will be obtained from the following detailed description of the preferred embodiments taken in conjunction with the drawings and the attached claims.

DETAILED DESCRIPTION

Figure 1:
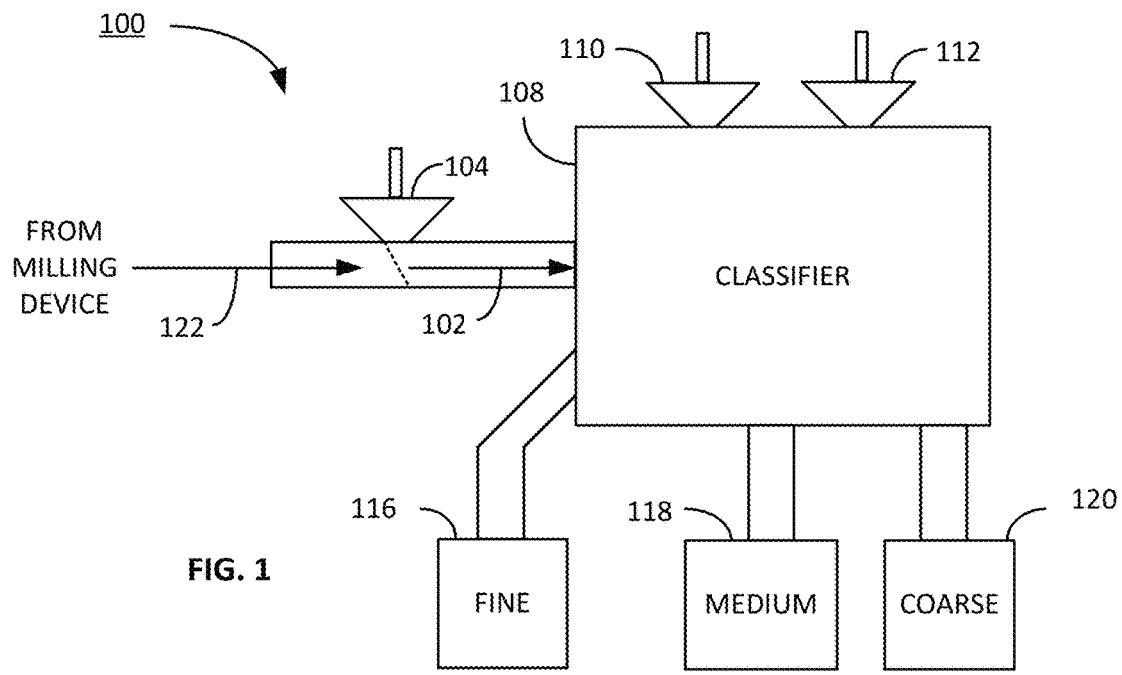
FIG. 1 illustrates a block diagram of one embodiment of a feed stock classification system.

FIG. 1 illustrates a system 100 for classification of a feed stock. The system 100 includes a feed stream 102, after being combined with a gasflow from a first gasflow element 104. The system 100 includes a classifier 108, with multiple gasflow elements 110, 112. Coming off the classifier 108 are collectors 116, 118, and 120.

The system 100 illustrates one exemplary embodiment, but it is recognized additional processing elements may be included. Moreover, varying elements can be omitted or left inactive depending on operating parameters.

A feed stock is milled using any suitable milling technique as recognized by one skilled in the art. Milling the feed stock therein generates a milled feed stock 122, the milled feed stock consists of the original feed stock milled into varying particle sizes. These different particles sizes are all conglomerated together prior to classification. The milled feed stock 122 is combined with gasflow from the gasflow element 104 to form the feed stream 102.

As used herein, the milled feed stock 122 can include milling of any suitable plant-based feed stock, including but not limited to chickpeas, legumes, soy, and fava beans. The feed stock naturally includes an inherent moisture and oil level that contributes weight, e.g. mass, that affects the distribution and classification steps noted herein. Therefore, the ideal feed stock has a minimal moisture and/or oil content level, or additional pre-processing steps can be included to de-oil or dry the feed stock prior to classification. Thus, the present classification method and system can use any available feed stock wherein milled feed stock is reduced to a composition for airflow and distribution across a curvilinear surface.

The first gasflow element 104 can be an injection element injecting gasflow into the feed stream. The gasflow element 104 can inject regular air, or any suitable gas, or gas mixture as recognized by one skilled in the art. The gas inserted by the gasflow element may vary depending on the milled feed stock 122. The combination of the milled feed stock 122 and the gas from gasflow element 104 generates the feed stream 102 being directed into the classifier 108.

The classifier 108 uses a curvilinear surface along with incoming airflow to separate the fed stream based on particle sizes. The classifier 108 may additionally employ gasflow elements 110, 112 to provide further external flow forces on the feed stream. The elements 110, 112 can inject the same gas as the element 104 or in another embodiment can use a different gas or combination or gasses for further assisting the separation and classification within the classifier 108. Moreover, the air volume and velocity of the gasflow elements 104, 110, and/or 112 can be adjusted for modifying the separation and classification within the classifier 108.

As described in further detail below, adjustable separation elements within the classifier 108 provide for separating and collecting the classification stream into the various collectors 116, 118, 120. The collectors can be any suitable device or devices for collecting the associated classification stream. In one embodiment, the type of collectors can be specific to the feed stock material, the particle size being collected, and can include appropriate dust/collection safety systems relative to the feed material. Moreover, FIG. 1 illustrates three collectors, but it is recognized that any suitable number of collectors can be used based on the number of separated classification streams.

Figure 2:
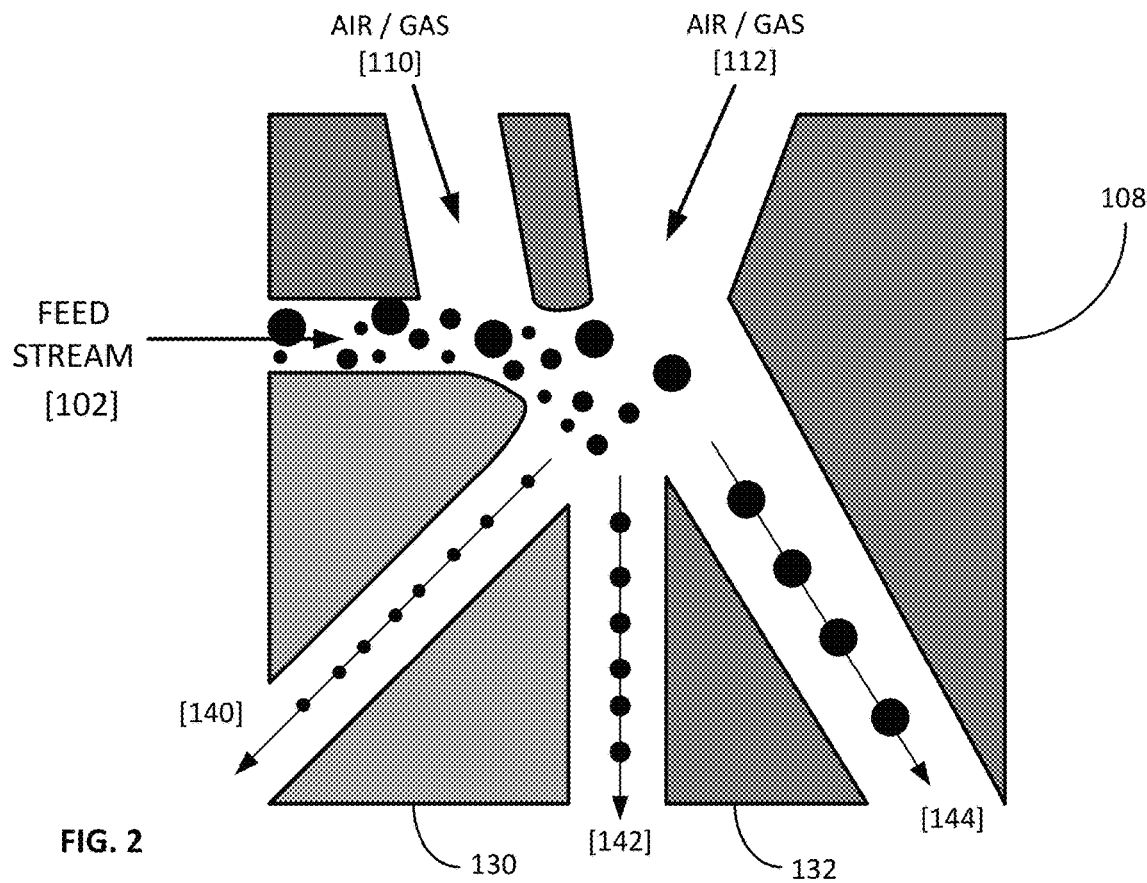
FIG. 2 illustrates one embodiment of the classifier of FIG. 1.

FIG. 2 illustrates a further illustration of the classifier 108 from FIG. 1. The classifier 108 includes an incoming channel receiving the milled feed stock. The incoming feed may include the inherent airflow velocity properties from the airflow element 104 of FIG. 1.

As the feed stream enters the classifier 108, the feed stream is directed across the curvilinear surface. Visible in FIG. 2, the airflow elements 110 and/or 112 can supplement the flow of the feed stream 102 as it crosses the curvilinear surface.

Illustrated in FIG. 2, the feed stream includes the milled feed stock composed of varying particle sizes. Solely for illustration purposes, FIG. 2 illustrates three sample sizes, small, medium and large particle sizing. As the feed stream 102 feeds over curvilinear surface, the particles naturally separate from each other based on inertia and electrostatic forces. One force acting on the particles in the feed stock is known as the Coanda effect, which is the naturally occurring phenomena of a jet flow attaching itself to a curved surface, even when the surface curves away from direction of the jet flow.

In the classifier 108, the feed stream 102 therein separates based on particles sizes. The smaller (finer) particle sizes remain closer to the curvilinear surface, the largest particles flow farthest away from the curvilinear surface, and the medium particles cover the area therebetween. The feed stream 102 separates into classification streams based on the distance the particles travel when passing over the curvilinear surface.

Further visible in FIG. 2, a plurality of dividers 130 are positioned for collecting the classification streams. In this embodiment, the dividers 130 are adjustable wedges positioned at varying locations for differentiation and collecting the classification streams.

The position of these dividers can relate to the particle ranges of the different classification streams. For example, as the divider 130 is moved closer to the curvilinear surface, the particles 140 of this classification stream will be smaller in range, the particles outside of the range passing into the later classification stream(s). Similar adjustments can apply to divider 132, as well as inclusion of additional dividers for additional classification streams. The illustrated example of three streams is exemplary in nature only, it is recognized that any number of different classification streams and dividers may be used.

In FIG. 2, the flow of particles then forms the classification streams ranging in size relative to the distance from the curvilinear surface. In the embodiment of two dividers 130, 132, this creates three classification streams: smallest (fine) 140; medium 142; and largest (coarse) 144. As illustrated in FIG. 1, the classification streams can then be fed into the collectors 116, 118, and 120 respectively.

Figure 3:
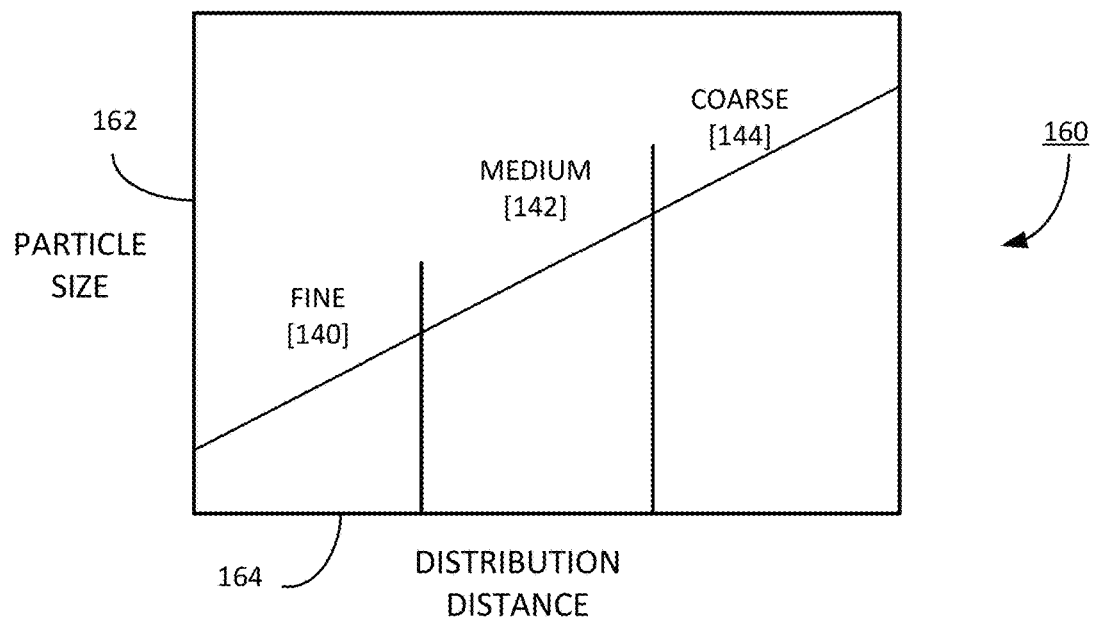
FIG. 3 is a graph illustrating one embodiment of feed stock particle size distribution using the classifier.

FIG. 3 illustrates a graphical representation 160 of how the feed stream is separated into classification streams. Based on air pressure and feed stream flow rates, the feed stream separates by particle size 162. This separation of denoted in distribution distance 164 from the curvilinear surface.

The finer particles 140 travel the shortest distance when passing over the curvilinear surface, due to inertia effects and the small particle mass. The medium particles 142 travel in the middle range and the coarsest particles travel the farthest from the curvilinear surface. In a homogenous feed, the distribution distance 164 relates almost directly with the particle size 162 due to the particle's mass contribution to the inertia and how it behaves when subjected to the coanda forces of the classifier 108 of FIG. 2. Additionally, position of the dividers 130 and 132 delineate the exemplary classification streams of this three-stream embodiment.

Figure 4:
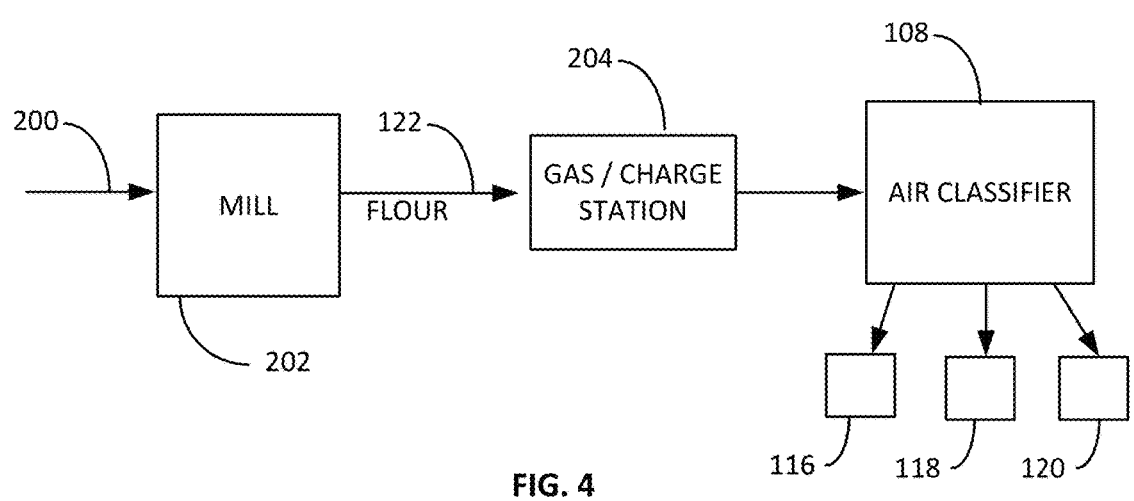
FIG. 4 illustrates an embodiment of the feed stock classification system.

FIG. 4 illustrates an embodiment, wherein the feed stock 200 is fed into a mill 202 prior to classification. The mill 202 may be any suitable milling device for processing feed stock. The mill 202, when milling the feed stock, naturally creates particles of varying sizes. The mill 202 can include a setting for a maximum particle size or grind setting.

The milling of the feed stock 202 then leads to further processing steps for classification, such as described above. The milled feed stock is part of the feed stream 102, including one embodiment of adding a gas and/or charge station(s) 204, similar to elements 104, 106 of FIG. 1.

The feed stream is fed into the classifier 108 for separating into classification streams as noted above. The collection devices 116, 118, and 120 therein collect the exemplary classification streams.

Additional embodiments may include further processing operations prior to integrating the milled feed stock 122 with the gasflow from element 104. For example, feedstock can be subject to drying or de-oiling operations. In another example, one embodiment may include inserting an electrical charge to the milled feed stock 122 prior to entering the classifier 108. In this embodiment, a charging station can create an electrical field through which the stock 122 passes.

Additional embodiments may include further processing operations after separation and classification by the classifier 108. For example, one embodiment can include additional milling and/or classification operations of the collected classification stream(s). For example, if feed stock having a fine particle size is of a high value, the fine classification stream (116 of FIG. 1) can be subjected to further classification, such as being refed into the classifier 108. Herein, in this embodiment, the adjustable dividers can be moved to now collected a finer grade of the fine classification stream. Similarly, the medium and coarse classification streams could be subject to additional milling and then fed through the classifier 108 for collecting of the fine or finer particle elements.

Figure 5:
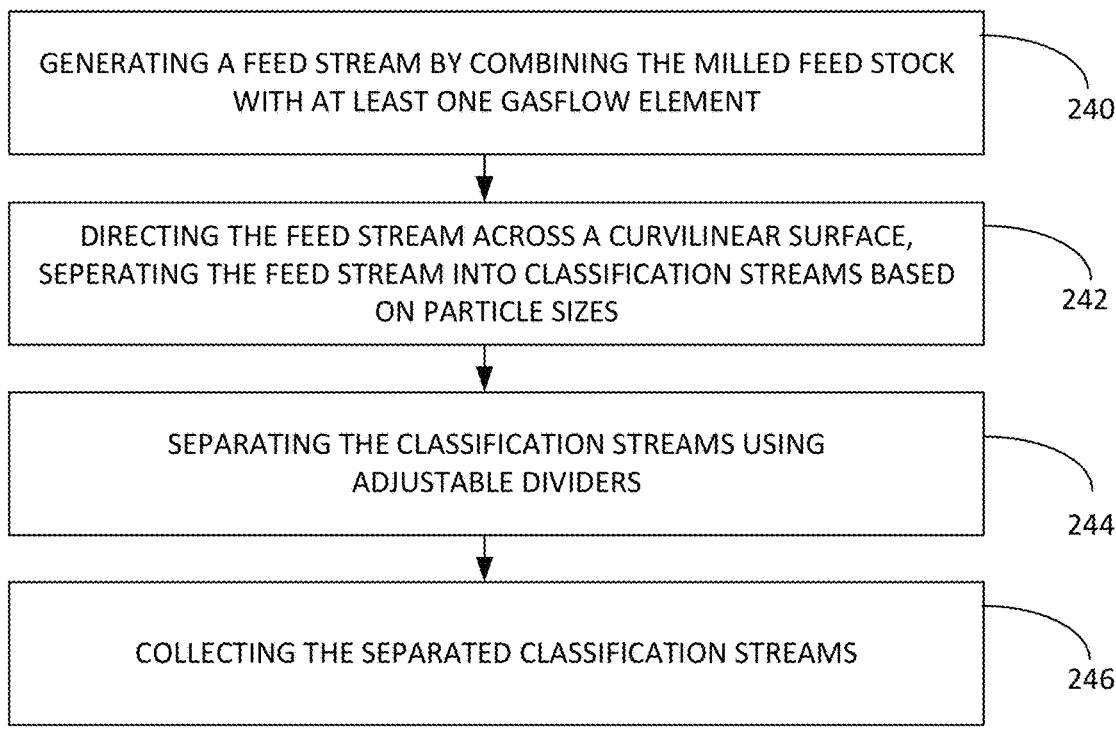
FIG. 5 illustrates a flowchart of the steps of one embodiment of a method for air classification of feed stock.

FIG. 5 illustrate a flowchart of the steps of one embodiment of a method for air classification of a milled feed stock. The method may be performed using the systems of FIGS. 1 and 2 above. Step 240 is generating a feed stream by combining the milled feed stock with at least one airflow element. This step may be performed consistent with the FIG. 1 noted above.

Step 242 is directing the feed stream across a curvilinear surface, such that the milled feed stock in the feed stream separates into numerous classification streams, each of the streams based on the particle sizes. The curvilinear surface may be the surface of FIG. 2 above, with the particle size distribution similar the exemplary distribution of FIG. 3.

Step 244 is separating the classification streams. In one embodiment, this separation step can be performed using dividers 130, 132 as illustrated in FIG. 2. The position of the dividers can be adjustable to change the classification stream collections. As the dividers begin particle collection based on distance travelled by the particle from the curvilinear surface, changing the divider distance collects different sizes. For example, moving the dividers 130, 132 of FIG. 2 correlates to the changing dividing lines on the graph of FIG. 3 between streams 140, 142, 144. Moving the divider further away from the curvilinear surface collects large particle sizes and moving the divider closer to the curvilinear surface collects smaller particle sizes.

Step 246 is collecting each of the different classification streams into separate collection units. This collection therein classifies the milled feed stock based on particle sizes associated with each of the separation streams, for example using collection units 116, 118, and 120 of FIG. 1.

In a further embodiment, the method may include adding supplemental airflow to the feed stream relative to passing over the curvilinear surface. In one embodiment, a first supplemental airflow can be immediately prior to the feed stream passing over the curvilinear and a second supplemental airflow can be directly after the feed passes over the curvilinear surface. The air volume and flow rates can be adjusted based on any number of factors, including classification goals, milled feed stock characteristics such as oil and water content levels, the incoming airflow element with the feed stock prior to entering the classification device, among other factors.

In further embodiments, additional processing operations to the feed stock can be performed prior to classification, for example drying or de-oiling operations.

Figure 6:
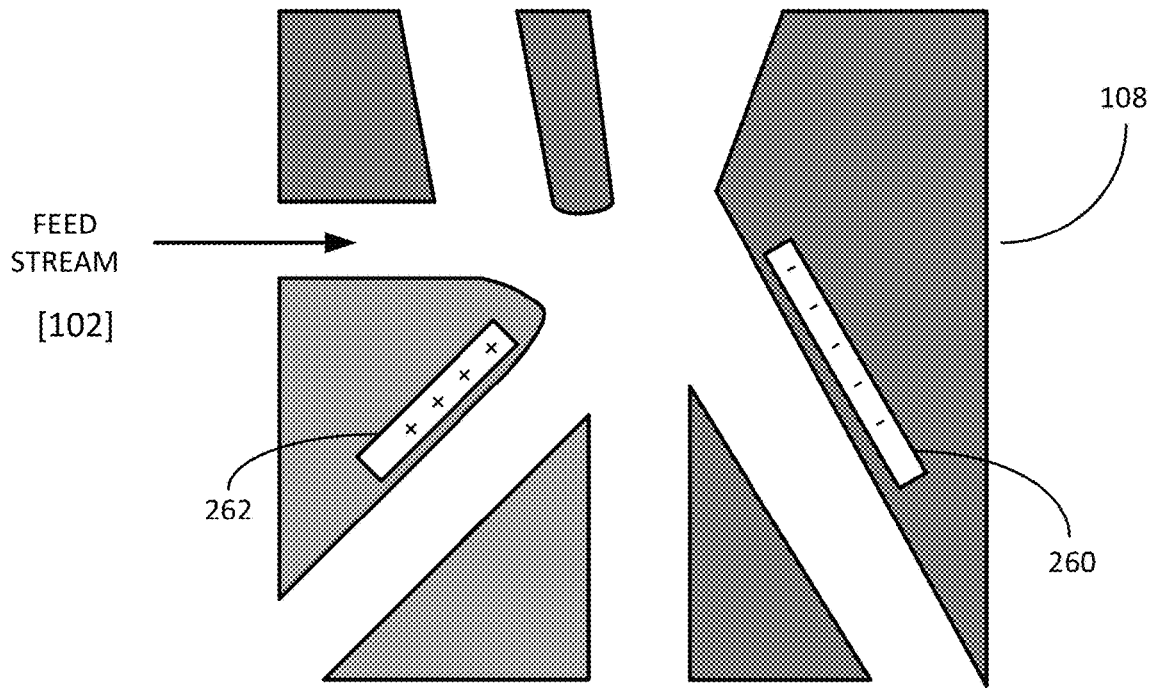
FIG. 6 illustrates an alternative embodiment of the classifier of FIG. 1.

FIG. 6 illustrates an alternative embodiment for air classification. In this embodiment, the classification device 108 includes electrical plates 260 and 262 in relation to the curvilinear surface. The plates 260 and 262 can be activated by an electrical device 114 to create an electric field in relation to the area where the feed stream passes over the curvilinear surface.

In this embodiment, inclusion of electrical forces can supplement the distribution of particles into classification streams. A further embodiment may include inserting an electrical charge or internal static forces within the feed stream prior to entering the classification device 108. For example, electrical elements may be parallel plates on opposing sides of the tube or channel carrying the feed stream. In another example, a pneumatic triboelectric charging device can insert an electric charge into the feed stream.

As used herein, a milling device may be any suitable milling device capable of generating a flour with each respective component adequately milled to be separated/detached from one another. For example, for many legumes, this level of refinement exists when the feed is milled to less than 100 microns.

Within the milled feed stock, the particles can range significantly in size, depending on the milling device and milling operations, as well characteristics of feed stock. For example, for a feed stock of legumes, a typical particle size can be smaller than 100 microns. For any material, a sufficient grind would be characterized by the efficient disruption/separation of the bonds between constituents in a mixture.

The gasflow from elements 104, 110, and 112 noted above can vary based on operational specifics including feed stock characteristics such as oil and water content, milling characteristics, positioning of the adjustable dividers, particle sizing and classification ranges for collection. In one embodiment, the gasflow being fed through the element 104 can be a high pressure gas with a flow rate greater than 10 PSIG.

The dimensions of the classifier 108 and the curved surface, also known as the coanda block, varies relative to scale. In one embodiment, noted below, the sizing of the coanda block operates in dimensional relationship with the adjustable dividers and air pressure for separation and classification sizing.

In one example, a milled chickpea flour ground to a d100 of 75 micron is incorporated at a rate a 2.65 kg/hr into a gas flow moving at a velocity between 28 and 35 m/s. The combined flow enters the classifier block through an orifice with a diameter of 25.4 mm where it passes over a curvilinear (coanda) surface and separated into 3 fractions (fine, medium, and coarse). Control gases set for velocities of 30-32 m/s and max 36 m/s for channels 1 and 2 respectively. In this instance the fines represent a concentrated protein, the coarse represents a concentrated starch fraction, and the medium cut represents a mixture of both. Within this example, the mass fraction of each the fine, medium, and coarse cuts was 15%, 50%, and 35% respectively (Table 1). The starch and protein composition of each fraction shows enrichment of protein in the fine fraction, a distribution among the medium fraction, and a starch enrichment in the coarse fraction obtained. Table 2 illustrates a detailed breakdown of composition.

TABLE 1

Mass Fraction of Each Cut in Reference to Provided Example Using a Feed of Chickpea Flour.

|  | FEED | FINE | MEDIUM | COARSE |
|---|---|---|---|---|
| Rate (kg/hr) | 2.5 | 0.375 | 1.25 | 0.875 |
| Percentage of Feed |  | 15% | 50% | 35% |

TABLE 2

Protein/Starch Composition Breakdown for Example Provided Using Chickpea Flour.

|  | FEED | FINE | MEDIUM | COARSE |
|---|---|---|---|---|
| Rate (kg/hr) | 2.5 | 0.375 | 1.25 | 0.875 |
| Percentage of Feed |  | 15% | 50% | 35% |

Per this example, the three fractions were collected and no further processing was conducted; however, the option exists to refeed any or all of these streams through a sequential pass through the classifier or another appropriate classification technology to further enrich the desired constituent.

In one embodiment, the incoming feed stream can be acquired from a flaking device instead of a milling device. The flaking device generally generates particles of large sizing, therefore one skilled in the art can modify the gasflow rate and spacing of the adjustable dividers to account for the large particle sizing.

Moreover, the above discussion of classification and separation relates to particle sizing, but it is appreciated that constituent elements within the feed stock can also be separated based on their sizing. In the example above, a chickpea feed stock can be separated into starch and protein constituent elements. Therefore, the present method and system can additionally separate the feed stock into constituent elements by exploiting differences in mass/particle sizes for the constituent elements.

The present method and system for air classification operates with any variety of feed stock, wherein that feed stock can be subject to milling (or flaking) or other operations to reduce it into smaller particle sizes. The feed stock can be a food source, for example but not limited to chickpeas, fava beans, peas, yellow pea, mung beans, pigeon pea, soybeans, or any member of the legume family.

In another embodiment, the feed stock can be agricultural product, for example but not limited to, wheat, hay, barley, corn, hemp, or other types of products.

In another embodiment, the feed stock can be a pharmaceutical product, for example separating a crushed pill or tablet into smaller particle sizing. As recognized by one skilled in the art, the pharmaceutical product can be medicinal product capable of being milled or ground into small particles and then subject to separation and classification as described herein.

In another embodiment, the milled feed stock can be a mineral or a refined ore capable of being grounded or milled into smaller particle sizes. For example, a mineral can be captured within a large element whereby the separation and classification allows for isolating a specific mineral. By way of example, one technique may seek to isolate minerals such as magnesium and calcium encapsulated within a large container, e.g. rock.

In another embodiment, the feed stock does not need to be an edible item, but can be non-edible, e.g. non-food based items. The above examples of minerals can be ingestible, but the present separation and classification applies to any suitable feed stream subject to milling or grinding. One embodiment may include separating and classifying components used as ingredients for ink, such as but not limited to carbon black and/or titanium dioxide.

In another embodiment, the feed stock, being food, non-food, mineral, pharmaceutical, or ink ingredients and being of a similar or same composition can be classified solely for the purpose of size classification and not just for the purpose of classifying different compositional elements in a feed.

FIGS. 1 through 6 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A method for air classification of a milled feed stock, the method comprising:
   generating a feed stream by combining the milled feed stock with at least one gasflow element, wherein the milled feed stock includes a plurality of particles, each of the plurality of particles having varying particle sizes and constituent elements including at least one of: a protein element and a starch element, the protein element having a first physical characteristic and the starch element having a second physical characteristic different from the first physical characteristic;
   directing the feed stream across a curvilinear surface, such that the milled feed stock in the feed stream separates into a plurality of classification streams based on the constituent elements and particle sizes of the milled feed stock;
   separating the plurality of classification streams based the particles sizes and the constituent elements of the particles, including the first physical characteristic of at least a first portion of the particles and the second physical characteristic of at least a second portion of the particles; and
   collecting each of the plurality of classification streams, thereby classifying the milled feed stock contained therein based at least on the constituent elements for each of the plurality of classification streams.

2. The method of claim 1, wherein the gasflow element includes at least one of: gas, air, and a combination of air and gas.

3. The method of claim 1 further comprising:
   separating the plurality of classification streams using at least one divider positioned after the curvilinear surface for dissecting an airflow of the feed stream.

4. The method of claim 3 further comprising:
   adjusting a position of the least one divider relative to the curvilinear surface for adjusting the particles sizes for the plurality of classification streams.

5. The method of claim 3, wherein the plurality of classification streams include a coarse fractionation stream, a medium fractionation stream, and a fine fractionation stream.

6. The method of claim 1, wherein the curvilinear surface is a convex surface with a specific radius.

7. The method of claim 1 further comprising:
adding supplemental gasflow via at least one supplemental gasflow chamber, the supplemental gasflow chamber positioned in relation to the curvilinear surface, the supplemental gasflow further directing the feed stream across the curvilinear surface.

8. The method of claim 7 further comprising:
adjusting the separation of the plurality of the classification streams by adjusting a volume of the supplemental airflow via the at least one supplemental airflow chamber.

9. The method of claim 1 further comprising:
generating an electrically charged milled feed of the milled feed within the feed stream;
generating an electrostatic field in relation to the curvilinear surface; and
separating the feed stream by the electrically charged milled feed stock interacting with the electrostatic field upon passing across the curvilinear surface.

10. The method of claim 9, wherein the electrostatic field is applied at least one of: before the curvilinear surface and after the curvilinear surface.

11. The method of claim 1, wherein the milled feed stock is an agricultural product.

12. The method of claim 1, wherein the milled feed material includes at least one of: chickpeas, fava beans, yellow pea, or any member of the legume family.

13. A method for air classification of a milled feed stock, the method comprising:
generating a feed stream by combining the milled feed stock with at least one gasflow element, wherein the milled feed stock includes a plurality of particles, each of the plurality of particles having varying particle sizes and constituent elements including at least one of: a first physical characteristic and a second physical characteristic different from the first physical characteristic;
generating an electrically charged milled feed by applying an electrical charge to the milled feed within the feed stream;
generating an electrostatic field in relation to the curvilinear surface;
directing the electrically charged milled feed across the curvilinear surface, such that the milled feed stock in the feed stream separates into a plurality of classification streams based on the constituent elements and particle sizes of the milled feed stock;
separating the plurality of classification streams based on the electrically charged milled feed stock interacting with the electrostatic field and based on the particles sizes and the constituent elements; and
collecting each of the plurality of classification streams, thereby classifying the milled feed stock contained therein based at least on the constituent elements for each of the plurality of classification streams.

14. The method of claim 13, wherein the electrostatic field is applied at least one of: before the curvilinear surface and after the curvilinear surface.

15. The method of claim 13, wherein the gasflow element includes at least one of: gas, air, and a combination of air and gas.

16. The method of claim 13 further comprising:
separating the plurality of classification streams using at least one divider positioned after the curvilinear surface for dissecting an airflow of the feed stream.

17. The method of claim 13 further comprising:
adjusting a position of the least one divider relative to the curvilinear surface for adjusting the particles sizes for the plurality of classification streams.

* * * * *